United States Patent

[11] 3,580,543

[72] Inventor Otto F. Hafeli
 Rte. 4, Box 929, Port Angeles, Wash. 98362
[21] Appl. No. 782,509
[22] Filed Nov. 29, 1968
[45] Patented May 25, 1971

[54] TRAILER JACK
4 Claims, 2 Drawing Figs.
[52] U.S. Cl. .................................................. 254/100,
 254/86, 254/108
[51] Int. Cl. ................................................... B66f 3/36
[50] Field of Search ......................................... 254/45, 86,
 89, 92, 100, 108

[56] References Cited
UNITED STATES PATENTS
3,155,373 11/1964 Rae ............................. 254/45
3,289,868 12/1966 Miller ........................... 254/45X
3,415,490 12/1968 Steele ........................... 254/45

Primary Examiner—Robert C. Riordon
Assistant Examiner—David R. Melton
Attorney—Graybeal, Cole and Barnard ABSTRACT: A generally rectangular bracket is secured to the underside of a trailer and provides a slot for receiving a tongue that is mounted on a slidable sleeve. The lower side of the bracket is shorter than the upper side to receive a brace that is welded between the sleeve and the brace so that the weight of the trailer is supported on the brace. The sleeve is adjustably mounted on an elongated frame and is locked in any desired position along the frame by a conventional pawl and detent mechanism. A nut is welded to the lower end of the elongated frame and a guide collar is welded to the top end. A threaded shaft extends through the collar and nut to position the elongated frame above the ground. The upper end of the threaded shaft is provided with a square head to be turned by a wrench or ratchet. The lower end of the shaft is rounded and rests in a cup formed integrally on a flat support plate.

Patented May 25, 1971  3,580,543

INVENTOR
OTTO F. HAFELI
BY
Graybeal, Cole & Barnard
ATTORNEYS

TRAILER JACK

BACKGROUND OF THE INVENTION

1. Field of the Invention

This invention pertains to jacking mechanisms for raising and supporting trailers or the like.

2. Description of the Prior Art

One heretofore known procedure for raising and supporting a trailer has been to raise each end of the trailer to the desired height and then lower it onto a support member, such as the well-known tripod stand or a similar support such as shown in the Meyer patent 2,356,941. Other prior art devices, such as shown in the Schaefer patent 3,093,362, have combined the elevating function with the supporting function by permanently securing the jacks to the trailer. In still other cases conventional automobile jacks, such as shown in the Snyder patent 2,458,961, have been adapted for raising and supporting a trailer.

In all of these known jacks or stands that are easily removable from the trailer there has been the common disadvantage that they are difficult to use and are unstable during high wind conditions. Although the permanently secured jacks provide suitable ease of operation and increased stability, they are expensive to manufacture and thus are available only to owners of the most luxurious, high priced trailers.

SUMMARY OF THE INVENTION

A feature of this invention is to provide a low-cost jack that is easily removable from the trailer for storage and yet provides exceptional stability in all types of wind conditions. The jack is quite simple to operate, is self-leveling, and is adjustable through a large elevation range. Basically the invention employs a tongue member that may be vertically adjusted above the ground by conventional apparatus and which is insertable in a bracket mounted on the bottom of the trailer. The bracket defines a slot or other suitable opening that tightly nests the tongue member so that movement or swaying of the trailer will produce a torque on the tongue member to counteract the sway.

DESCRIPTION OF THE PREFERRED EMBODIMENTS

Figure 1:
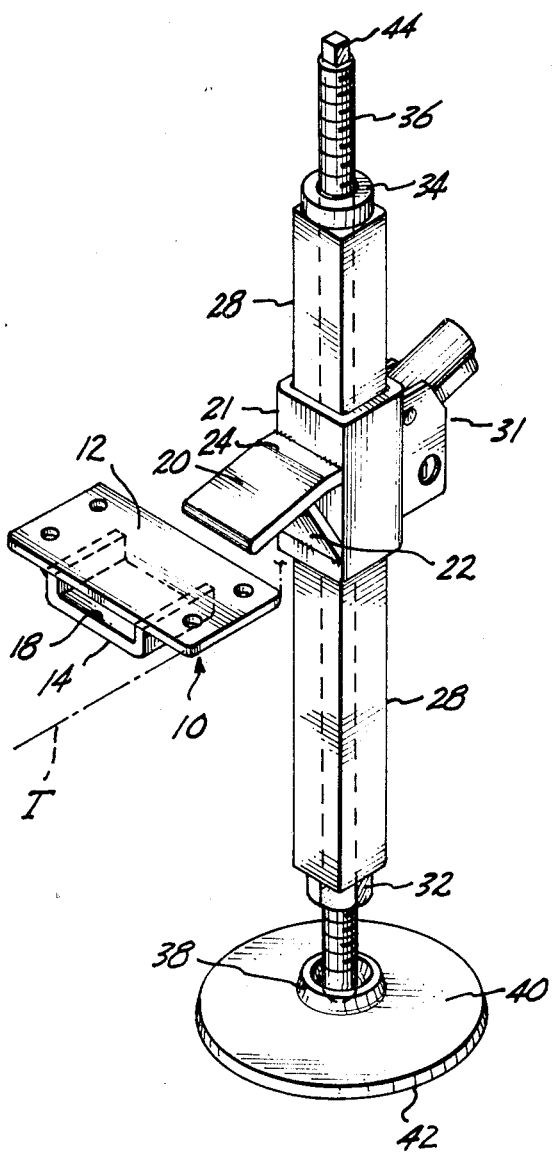
FIG. 1 is an isometric illustration of the preferred form of trailer jack embodying the principles of the invention.
Figure 2:
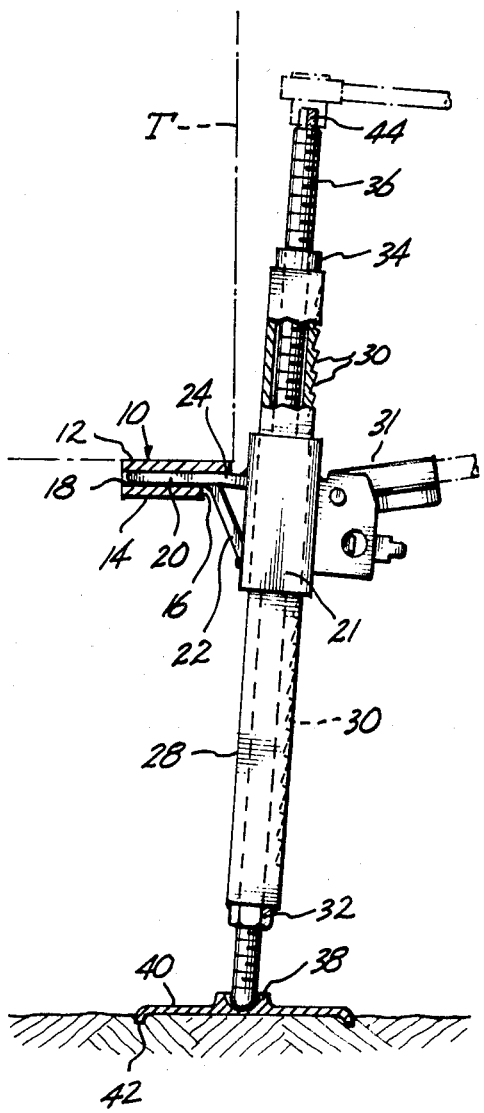
FIG. 2 is an elevation of the trailer jack of FIG. 1 shown in a position supporting the trailer.

A generally rectangular bracket 10 is suitably secured near the corner to the underside of a trailer T, shown in phantom lines, either by bolts, screws, or other suitable means. The bracket may be welded to one of the various transverse angles supporting the trailer frame or may be secured directly to the longitudinal frame members. The rectangular bracket includes a top side 12 and a bottom side 14. As is best shown in FIG. 2, the bottom side 14 is of a width smaller than the top side 12 so that a recess 16 is formed. The top and bottom sides form a slot 18.

A tongue member 20 or the like is insertable within the slot and is secured as by welding to a sleeve 21. An angle brace 22 is welded to the sleeve and to the underside of the tongue about one-third of the distance along the length of the tongue. The tongue member is rectangular in shape; however, other forms are suitable provided they counteract lateral and longitudinal movement of the trailer. As is best shown in FIG. 2 the tongue member is inserted into the slot 18 with the brace 22 abutting against the lower side of the bracket. In this manner the weight of the trailer T is applied primarily on the brace 22 and reduces the cantilever load on the tongue member. The tongue member is bent as at 24 to space the jack from the side of the trailer.

The sleeve 21 is generally tubular in shape and is adjustably mounted on an elongated frame 28. Any form of adjustment mechanism may be used to position the sleeve on the elongated frame. Preferably the mechanism is similar to that used on a conventional automobile bumper jack. For this purpose the elongated frame is provided with a series of vertical corrugations or teeth 30 which are engaged in a conventional manner by a ratchet 31. By pivoting the ratchet 31 the sleeve may be raised or lowered along the elongated frame 28.

The elongated frame 28 is also supported for a fine adjustment. For this purpose a nut 32 is welded to the bottom of the frame and a guide collar 34 is welded to the top. A threaded shaft 36 is slidably supported in the guide collar and threads through the nut 32. The base of the threaded shaft is rounded and nests in an upturned cup 38 integrally formed on a support plate 40. As is best shown in FIG. 2 the outer edge of the support plate is downturned to form a lip 42. The lip will dig into the ground so that the support plate is self-anchoring. The universal-type connection between the rounded end of the threaded shaft 30 and the cup 38 provides a self-leveling feature for the jack. The upper end of the threaded shaft 36 is provided with a square head 44 which may be suitably turned by a wrench or ratchet. As is best shown in FIG. 2, the bend 24 in the tongue member positions the upper end of the threaded shaft a substantial distance away from the side of the trailer T so that the wrench may be easily manipulated.

In operation, the trailer is brought to rest at the desired location and disconnected from the vehicle. The tongue 20 is inserted in a bracket 10 at one of the corners of the trailer. The sleeve 26 is then adjusted along the elongated frame 28 until the rounded end of the shaft 36 rests in the cup 38 or is just above the cup 38. The shaft is then rotated with the use of the wrench or ratchet to elevate the corner of the trailer to approximately the desired height.

The procedure is then repeated for each of the three remaining corners of the trailers until all four corners are supported on the jacks. It is then a simple procedure to raise or lower each corner of the trailer by rotating the threaded shaft of each jack until the desired level is obtained.

As the tongues will be inserted well within the slots 18 the trailer will be precluded from swaying in high wind conditions without producing a twisting torque on each of the tongue members. The jacks will thus hold the trailer in a stable position.

When it is time to move the trailer the reverse procedures are followed. That is, the threaded shafts 36 are rotated lowering the elongated frame until the tongue member is loose in the bracket. The jack may then be removed from the trailer. The support plate and, if desired, the sleeve may be disassembled for ease of storing.

Although one specific form of the invention has been illustrated and described herein, it should be understood that various alterations in the details of construction and mode of assembly and operation may be made without departing from the scope of the invention.

What I claim is:

1. A jack for elevating and supporting a trailer or the like, comprising:
    a bracket secured to the underside of a trailer and having an opening therein;
    a tongue member insertable within said opening, said tongue member conforming closely to the shape of the opening to provide a snug fit therebetween; and
    means for adjustably supporting said tongue member above the ground, said means including a sleeve mounted on a elongated frame and being adjustably positioned along the frame for a rough adjustment by a pawl and ratchet mechanism, a threaded shaft threadably secured to the frame, for a fine adjustment; and a support plate resting on the ground surface for supporting the threaded shaft.

2. The jack defined by claim 1, wherein said opening in said bracket is a generally rectangular slot and said tongue member is generally rectangular and of a size slightly less than the slot.

3. The jack defined by claim 2, wherein said bracket includes an upper side and a lower side defining said slot, said lower side being smaller than said upper side to provide a recess at the outer end of said bracket, and further including a brace secured between said tongue member and said sleeve and being nested within said recess.

4. The jack defined by claim 1 wherein said tongue member has a transverse bend.